United States Patent
Dancewicz et al.

(10) Patent No.: US 11,620,451 B2
(45) Date of Patent: *Apr. 4, 2023

(54) ITERATIVE TRAINING FOR TEXT-IMAGE-LAYOUT TRANSFORMER

(71) Applicant: Applica sp. z o.o., Warsaw (PL)

(72) Inventors: Adam Dancewicz, Warsaw (PL); Filip Gralinski, Warsaw (PL); Lukasz Konrad Borchmann, Poznan (PL)

(73) Assignee: APPLICA SP. Z O.O., Warsaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,313

(22) Filed: Jun. 16, 2022

(65) Prior Publication Data
US 2022/0327286 A1 Oct. 13, 2022

Related U.S. Application Data (63) Continuation of application No. 17/651,313, filed on Feb. 16, 2022.

(60) Provisional application No. 63/150,271, filed on Feb. 17, 2021.

(51) Int. Cl.
| | | |
|---|---|---|
| *G10L 21/00* | (2013.01) |
| *G06F 40/295* | (2020.01) |
| *G06F 40/106* | (2020.01) |
| *G06F 40/30* | (2020.01) |
| *G06T 11/60* | (2006.01) |
| *G06N 3/08* | (2023.01) |

(52) U.S. Cl.
CPC .......... *G06F 40/295* (2020.01); *G06F 40/106* (2020.01); *G06F 40/30* (2020.01); *G06N 3/08* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 9,953,008 B2 | 4/2018 | Zaric | |
| 10,636,074 B1 | 4/2020 | Bentley | |
| 10,990,645 B1 * | 4/2021 | Shi | ............ G06N 3/08 |

(Continued)

FOREIGN PATENT DOCUMENTS

| | | |
|---|---|---|
| WO | WO-2022175847 A1 | 8/2022 |
| WO | WO-2022175849 A1 | 8/2022 |

OTHER PUBLICATIONS

Xu, et al. "Layoutimv2: Multi-Modal Pre-Training for Visually-Rich Document Understanding," arXiv prepring arXiv:2012.147040v4 [cs.CL] (Jan. 10, 2022).

(Continued)

*Primary Examiner* — Satwant K Singh
(74) *Attorney, Agent, or Firm* — Schwegman Lundberg & Woessner, P.A.

(57) ABSTRACT

Disclosed herein is a system and method for Natural Language Processing (NLP) of real world documents. the system and method combines various models not previously combined and overcomes the challenges of this combination. Models include an encoder-decoder model, a spatial model, and a multi-modal model. An iterative training process receives documents and generates outputs, wherein the iterative training process comprises enabling information retrieval from documents without training data.

28 Claims, 10 Drawing Sheets

(56) References Cited

U.S. PATENT DOCUMENTS

| | | | |
|---|---|---|---|
| 11,455,468 B2* | 9/2022 | Dancewicz | G06V 10/82 |
| 2019/0294874 A1 | 9/2019 | Orlov | |
| 2020/0349178 A1* | 11/2020 | Raju | G06N 3/0454 |
| 2020/0349415 A1* | 11/2020 | Raju | G06N 3/0454 |
| 2021/0081613 A1 | 3/2021 | Begun | |
| 2021/0081729 A1 | 3/2021 | Huang | |
| 2021/0271707 A1 | 9/2021 | Lin et al. | |
| 2021/0342785 A1 | 11/2021 | Mann | |
| 2022/0036063 A1 | 2/2022 | Bhuyan | |
| 2022/0076109 A1* | 3/2022 | Srivastava | G06N 3/063 |
| 2022/0157341 A1 | 5/2022 | Adato | |
| 2022/0261547 A1* | 8/2022 | Dancewicz | G06F 40/30 |
| 2022/0270311 A1* | 8/2022 | Borchmann | G06T 11/60 |

OTHER PUBLICATIONS

Raffel, et al. "Exploring the Limits of Transfer Learning with a Unified Text-to-Text Transformer," Journal of Machine Learning Research 21 (2020), published Jun. 2020, pp. 1-67.

Hewlett, et al. "WikiReading: A Novel Large-Scale Language Understanding Task over Wikipedia," Proceedings of the 54th Annual Meeting of the Association for Computational Linguistics, pp. 1535-1545, Aug. 7-12, 2016.

Hermann, et al. "Teaching Machines to Read and Comprehend," Advances in Neural Information Processing Systems 28 (Year 2015).

Sarkhel, et al. "Deterministic Routing Between Layout Abstractions for Multi-Scale Classification of Visually Rich Documents," Proceedings of the Twenty-Eighth International Joint Conference on Artificial Intelligence (IJCAI-19) (Year 2019).

Xu, et al., "LayoutLM: Pre-training of Text for Layout for Document Image Understanding," Proceedings of the 26th ACM SIGKDD Conference on Knowledge Discovery and Data Mining (KDD '20), Aug. 23-27, 2020, Virtual Event, CA, USA, 9 pages.

European Patent Office, International Searching Authority, "International Search Report and Written Opinion," International Application No. PCT/IB2022/051392, dated May 31, 2022.

European Patent Office, International Searching Authority, "International Search Report and Written Opinion," International Application No. PCT/IB2022/051394, dated May 25, 2022.

"U.S. Appl. No. 17/651,311, Final Office Action dated Sep. 21, 2022", 23 pgs.

"U.S. Appl. No. 17/651,311, Non Final Office Action dated Jun. 7, 2022", 22 pgs.

"U.S. Appl. No. 17/651,311, Response filed Sep. 6, 2022 to Non Final Office Action dated Jun. 7, 2022", 9 pgs.

"U.S. Appl. No. 17/651,313, Corrected Notice of Allowability dated Jul. 19, 2022", 2 pgs.

"U.S. Appl. No. 17/651,313, Notice of Allowance dated May 17, 2022", 9 pgs.

Xu, Canwen, et al., "Obj-glove: Scene-based contextual object embedding", arXiv: 1907.01478v1 [cs.CV] Jul. 2, 2019, (2019), 14 pgs.

Xu, Yang, et al., "LayoutLMv2: Multi-modal Pre-training for Visually-rich Document Understanding", arXiv: 2012.14740v4 [cs.CL] Jan. 10, 2022, (2022), 13 pgs.

"U.S. Appl. No. 17/651,311, Examiner Interview Summary dated Nov. 22, 2022", 2 pgs.

Cho, Minseok, et al., "Adversarial TableQA: Attention supervision for question answering on tables", Proceedings of Machine Leaning Research 95, (2018), 391-406.

Choi, Eunsol, et al., "QuAC: Question Answering in Context", Proceedings of the 2018 Conference on Empirical Methods in Natural Language Processing, (2018), 2174-2184.

Chuang, Yung-Sung, et al., "SpeechBERT: An audio-and-text jointly learned language model for end-to-end spoken question answering", Interspeech 2020, Oct. 25-29, 2020, Shanghai, China, (2020), 5 pgs.

Clark, Jonathan H., et al., "TyDi QA: A benchmark for information-seeking question answering in typologically diverse languages TACL (2020)", Transactions of the Association for Computational Linguistics, vol. 8, (2020), 454-470.

Dai, Jifeng, et al., "R-FCN: Object detection via region-based fully convolutional networks. In: NeurIPS (2016)", Advances in Neural Information Processing Systems 29 (NIPS 2016), (2016), 1-9.

Denk, Timo I., et al., "BERTgrid: Contextualized Embedding for 2d Document Representation and UnderstandinD", arXiv preprint, arXiv:1909.04948v2 [cs.CL] Oct. 14, 2019, (2019), 4 pgs.

Dodge, Jesse, et al., "Finetuning Pretrained Language Models: Weight Initializations, Data Orders, and Early Stopping", ArXiv preprint, ARxIV:2002.06305v1 [cs.CL] Feb. 15, 2020, (2020), 11 pgs.

Dua, Dheeru, et al., "DROP: A reading comprehension benchmark requiring discrete reasoning over paragraphs", Proceedings of NAACL-HLT 2019, (2019), 2368-2378.

Dwojak, Tomasz, et al., "From Dataset Recycling to Multi-Property Extraction and Beyond", Proceedings of the 24th Conference on Computational Natural Language Learing, (2020), 641-651.

Ethayarajh, Kawin, et al., "How Contextual are Contextualized Word Representations? Comparing the Geometry of BERT, ELMo, and GPT-2 Embedding", Proceedings of the 2019 Conference on Empirical Methods in Natural Language Processing and the 9th International Joint Conference on Natural Language Processing, (2019), 55-65.

Garncarek, Lukasz, et al., "LAMBERT: Layout-Aware Language Modeling for Information Extraction", accepted to ICDAR 2021, (Oct. 22, 2021), 1-16.

Guu, Kevin, et al., "Retrieval augmented language model pre-training", Proceedings of the 37th International Conference on Machine Learning, PMLR 119, (2020), 10 pgs.

Han, Kai, et al., "A Survey on Visual Transformer", arXiv:2012. 12556v3 [cs.CV] Jan. 30, 2021, (2021), 26 pgs.

Harley, Adam D., et al., "Evaluation of deep convolutional nets for document image classification and retrieval", 2015 International Conference on Document Analysis and Recognition (ICDAR), (2015), 991-995.

Herzig, Jonathan, et al., "TaPas: Weakly supervised table parsing via pre-training", Proceedings of the 58th Annual Meeting of the Association for Computational Linguistics, (2020), 4320-4333.

Hewlitt, Daniel, et al., "WikiReading: A novel large-scale language understanding task over Wikipedia", Proceeding of the 54th Annual Meeting of the Association for Computational Linguistics (vol. 1, Long Papers), (2016), 1535-1545.

Ho, Jonathan, et al., "Axial attention in multidimensional transformers", arXiv preprint, arXiv:1912.12180v1 [cs.CV] Dec. 20, 2019, (2019), 11 pgs.

Hong, Teakgyu, et al., "BROS: A pre-trained language model for understanding texts in document openreview.net preprint", openreview. net preprint, ICLR, (2021), 17 pgs.

Huang, Zheng, et al., "ICDAR2019 Competition on Scanned Receipt OCR and information Extraction", 2019 International Conference on Document Analysis and Recognition (ICDAR), (2019), 1516-1520.

Hwang, Wonseok, et al., "Spatial dependency parsing for semi-structured document information extraction", ArXiv preprint, arXiv:2005.006442v3 [cs.CL] Jul. 1, 2021, (2020), 14 pgs.

Jaume, Guillaume, et al., "FUNSD: A dataset for form understanding in noisy scanned documents", 2019 International Conference on Document Analysis Workshops (ICDARW), (2019), 1-6.

Kafle, Kushal, et al., "DVQA: understanding data visualizations via question answering", 2 018 IEEE/CVF Conference on Computer Vision and Pattern Recognition, (2018), 5648-5656.

Kahou, Samira E., et al., "FigureQA: An annotated figure dataset for visual reasoning", Workshop track, ArXiv preprint, arXiv:1710. 07300v2 [cs.CV] Feb. 22, 2018, (2018), 20 pgs.

Kasai, Jungo, et al., "Deep encoder, shallow decoder: Reevaluating the speed-quality tradeoff in machine translation", Published as a conference paper at ICLR 2021, (2021), 1-16.

Keskar, Nitish, et al., "Unifying question answering and text classification via span extraction", ArXiv preprint, arXiv:1904.09286v2 [cs.CL] Sep. 20, 2019, (2019), 10 pgs.

(56) References Cited

OTHER PUBLICATIONS

Khashabi, Daniel, et al., "UnifiedQA: Crossing format boundaries with a single QA system", Findings of the Association for Computational Linguistics (EMNLP 2020), (2020), 1896-1907.

Knot, Tushar, et al., "QASC: A dataset for question answering via sentence composition.", The Thirty-Fourth AAAI Conference on Artificial Intelligence (AAAI-20), (2020).

Kudo, T.Aku, et al., "Subword regularization: Improving neural network translation models with multiple subword candidates.", Proceedings of the 56th Annual Meeting of the Association for Computational Linguistics (Volume 1: Long Papers), 66-75.

Kumar, Ankit, et al., "Ask me anything: Dynamic memory networks for natural language processing.", Proceedings of the 33rd International Conference on Machine Learning, vol. 48, (2016), 10 pgs.

Kwiatkowski, Tom, et al., "Natural questions: A benchmark for question answering research. TACL (2019)", Transactions of the Association for Computational Linguistics, vol. 7, (2019), 453-466.

Lai, Guokun., et al., "RACE: Large-scale ReAding comprehension dataset from examinations", Proceedings of the 2017 Conference on Empirical Methods in Natural Language Processing, (2017), 785-794.

Le, Hung, et al., "Multimodal Transformer Networks for End-to-End Video-Grounded Dialogue System", Proceedings of the 57th Annual Meeting of the Association for Computational Linguistics, (2019), 5612-5623.

Lee, Kuang-H H., et al., "Stacked Cross Attention for Image-Text Matching", ECCV 2018, (2018).

Lewis, Mike, et al., "BART: Denoising sequence-to-sequence pre-training for natural language generation, translation, and comprehension", Proceedings of the 58th Annual Meeting of the Association for Computational Linguistics, (2020), 7872-7880.

Li, Liunian H., et al., "VisualBERT: A simple and performant baseline for vision and language", arXiv preprint, arXiv:1908.03557v1 [cs.CV] Aug. 9, 2019, (2019), 14 pgs.

Liu, Xiaojing, et al., "Graph convolution for multimodal information extraction from visually rich documents. In:", Proceedings of NAACL-HLT 2019, (2019), 32-39.

Ma, Junteng, et al., "Fusion of image-text attention for transformer-based multimodal machine translation.", 2019 International Conference on Asian Language Processing (IALP), (2019), 199-204.

Mathew, Minesh, et al., "DocVQA: A dataset for VQA on document images", IEEE/CVF Winter Conference on Applications of Computer Vision (WACV), (2021), 2200-2209.

McCann, Bryan, et al., "The Natural Language Decathlon: Multitask Learning as Question answering", arXiv preprint, arXiv:1806.087230v1 [cs.CL] Jun. 20, 2018, (2018), 23 pgs.

Palm, Rasmus B., et al., "CloudScan—a configuration-free invoice analysis system using recurrent neural networks", Proceedings of 2017 14th IAPR International Conference on Document Analysis and Recognition, (2017), 8 pgs.

Park, Seunghyun, et al., "CORD: A consolidated receipt dataset for post-ocr parsing", 33rd Conference on Neural Information Processing Systems (NeurIPS 2019), Vancouver, Canada, (2019), 1-4.

Powalski, R., et al., "Going Full-TILT Boogie on Document Understanding with Text-Image-Layout Transformer", arXiv:2102.09550v3 [cs.CL] Jul. 12, 2021, (2021), 18 pgs.

Powalski, Rafal, et al., "UniCase { rethinking casing in language models", ArXiv preprint, arXiv:2010.11936v1 [cs.CL] Oct. 12, 2020, (2020), 5 pgs.

Radford, Alec, et al., "Language models are unsupervised multitask learners", Technical Report, OpenAI, (2019), 24 pgs.

Raffel, Colin, et al., "Exploring the Limits of Transfer Learning With a Unified Text-to-Text Transformet", Journal of Machine Learning Research 21, (2020), 1-67.

Rajpurkar, Pranav, et al., "SQuAD: 100,000+ questions for machine comprehension of text In: EMNLP (2016)", Proceedings of the 2016 Conference on Empirical Methods in Natural Language Processing, (2016), 2383-2392.

Reddy, Siva, et al., "CoQA: A Conversational Question Answering Challenge", Transactions of the Association for Computational Linguistic, vol. 7, (2019), 249-266.

Ren, Yi, et al., "A study of non-autoregressive model for sequence generation.", Proceedings of the 58th Annual Meeting of the Association for Computational Linguistics, (2020), 149-159.

Ronneberger, O., et al., "U-Net: Convolutional Networks for Biomedical Image Segmentation.", Medical Image Computing and Computer Invention (MICCAI) (LNCS 9351), (2015), 234-241.

Sennrich, Rico, et al., "Neural Machine Translation of Rare Words with Subword Units", Proceedings of the 54th Annual Meeting of the Association for Linguistics, Computational(Volume 1: Long Papers), (2016), 1715-1725.

Sidorov, Oleksii, et al., "TextCaps: A dataset for image captioning with reading comprehension", ArXiv preprint, arXiv:2003.12462v2 [cs.CV] Aug. 4, 2020, (2020), 26 pgs.

Singh, Amanpreet, et al., "Towards VQA models that can read", CVPR, (2019), 10 pgs.

Stanislawek, Tomasz, et al., "Kleister: Key information extraction datasets involving long documents with complex layouts", ArXiv preprint, arXiv: submit/3741295 [cs.CL] May 12, 2021, (2021), 16 pgs.

Su, Weijie, et al., "VL-BERT: pre-training of generic visual-linguistic representations", Published as a conference paper at ICLR 2020, (2020), 16 pgs.

Vaswani, Ashish, et al., "Attention Is All You Need", Proceedings, 31st Conference on Neural Processing Systems (NIPS 2017), (2017), 1-11.

Xu, Yang, et al., "LayoutLMv2: Multi-modal pre-training for visually-rich document understanding", ArXiv preprint, arXiv:2012.14740v4 Jan. 10, 2022, (2020), 13 pgs.

Xu, Yiheng, et al., "LayoutLM: Pre-training of text and layout for document image understanding", KDD' 20: The 26th ACM SIKGDD Conference on Knowledge Discovery and Dat Mining, (2020), 14 pgs.

Yin, P., et al., "TaBERT: Pretraining for joint understanding of textual and tabular data", Proceedings of the 58th Annual Meeting of the Association for Computational Linguistics, (2020), 8413-8426.

\* cited by examiner

ITERATIVE TRAINING FOR TEXT-IMAGE-LAYOUT TRANSFORMER

RELATED APPLICATIONS

This application is a continuation of U.S. patent application Ser. No. 17/651,313, filed Feb. 16, 2022, which claims the benefit of U.S. Provisional Patent Application No. 63/150,271, filed Feb. 17, 2021. The foregoing patent application are incorporated by reference herein in their entirety.

FIELD OF THE INVENTION

Inventions disclosed and claimed herein are in the field of natural language processing (NLP), and particularly NLP of real-world documents that include tables, figures, forms, and pictures.

BACKGROUND

Most tasks in Natural Language Processing (NLP) can be unified under one framework by casting them as triplets of question, context and answer. We consider such unification of Document Classification, Key Information Extraction and Question Answering in a demanding scenario where context extends beyond the text layer.

This challenge is prevalent in business cases since contracts, forms, applications, and invoices cover a wide selection of document types and complex spatial layouts.

So far, successes achieved in NLP involve models that map raw textual input into raw textual output, which usually are provided in a digital form. An important aspect of real-world oriented problems is the presence of scanned paper records and other analog materials that became digital. As a consequence, there is no easily accessible information regarding the document layout or reading order, and these are to be determined as a part of the process. Furthermore, interpretation of shapes and charts beyond layout may be useful to find the values for some of the requested properties. A system cannot rely solely on text, but requires incorporating information from structure and images.

Figure 1A:
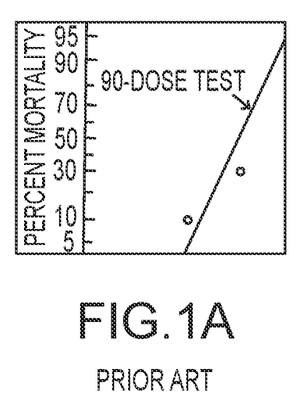
FIGS. 1A to 1C are illustrations of real-world document data as seen using different prior art modalities.
Figure 1B:
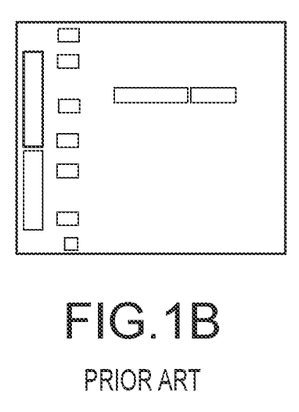
Figure 1C:
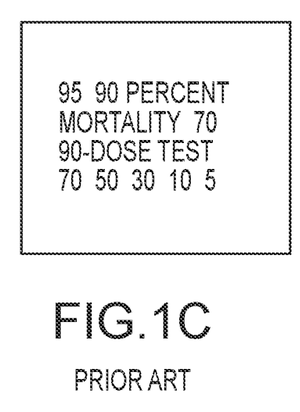

As shown in FIG. 1, The same document is perceived differently depending on chosen modalities. FIG. 1A focuses on the visual aspect. Schema in FIG. 1B presents spatial relationships between bounding boxes of detected words. Finally, there is an unstructured text of the same excerpt in FIG. 1C, as returned by optical character recognition (OCR) under the detected reading order. Thus, it takes three modalities to solve this fundamental challenge. Extraction of key information from richly formatted documents lies precisely at the intersection of NLP, Computer Vision and Layout Analysis.

TABLE 1

| Task | Annotation | Exact match | Layout |
|---|---|---|---|
| CoNLL 2003 | word-level | 100% | – |
| SROIE | } document-level | 93% | + |
| WikiReading | | 20% | – |
| Kleister | | 27% | + |

Sequence labeling models can be trained in all cases where the token-level annotation is available or can be easily obtained. Limitations of this approach are strikingly visible on tasks framed in either key information extraction or property extraction paradigms. Here, no annotated spans are available, but only property-value pairs are assigned to the document. Occasionally, it is expected from the model to mark some particular subsequence of the document.

Referring to Table 1, a comparison of tasks assuming extraction of real-world objects mentioned in the text is shown. Expected values are always present in a substring of a document in Named Entity Recognition, but not elsewhere. However, problems where the expected value is rarely a substring of considered text, are unsolvable assuming sequence labeling methods. As a result, authors applying state-of-the-art entity recognition models are forced to rely on human-made heuristics and time-consuming rule engineering. Particular problems one has to solve when employing a sequence-labeling method can be divided into three groups. We investigate them below to precisely point out the limitations of this approach.

Take an example of the total amount assigned to a receipt in the SROIE dataset. Suppose there is no exact match of expected value in the document, e.g., due to OCR error, incorrect reading order, or different decimal separator used. Unfortunately, a sequence labeling model cannot be applied off-the-shelf, and authors dealing with property extraction rely on either manual annotation or the heuristic-based tagging procedure that impacts the overall end-to-end results. Moreover, when receipts with one item listed are considered, the total amount is equal to a single item price, which is the source of yet another problem. More precisely, if there are multiple matches of the value in the document, it is ambiguous whether to tag all of them, some of them, or none of them.

Another problem one has to solve is to decide how many of the detected entities to return, which of them, and whether to normalize the output somehow. As a consequence, the authors of Kleister proposed a set of handcrafted rules for the final selection of the entity values. These and similar rules are both labour-intensive and prone to errors.

Finally, the property extraction paradigm does not assume the requested value appeared in the article in any form, since it is sufficient for it to be inferable from the content, as in the case of document classification or non-extractive question answering.

These various challenges impose extra conditions beyond NLP.

It would be desirable to have a real-world NLP document processing system that overcomes the stated deficiencies of the prior art.

DETAILED DESCRIPTION

The challenges and limitations presented by previous approaches to real-world document natural language processing (NLP) are largely overcome by a new architecture as described herein. In an embodiment, layout-aware models are formulated within an encoder-decoder framework. As name entity recognition (NER)-based extraction is disconnected from the final purpose the received data is used for, a typical real-world scenario demands the setting of Key Information Extraction. To address this issue, an embodiment focuses on the applicability of an encoder-decoder model, since it can generate values not included in the input text explicitly, and performs reasonably well on all text-based problems involving natural language. This potentially solves all identified problems of sequence labeling architectures and ties other tasks, such as Question Answering or Text Classification, into the same framework. For example, the model may deduce to answer yes or no depending on the question form only. Its end-to-end elegance and ease of use, allows one to not rely on human-made heuristics and to get rid of time-consuming rule engineering required in the sequence labeling paradigm.

In embodiments, the architecture employs several different models not previously combined, including encoder-decoder, spatial, and multi-modal. One embodiment is based on a Transformer approach, and focuses on inclusion of spatial information or different modalities in text-processing systems, as well as on applicability of encoder-decoder models to Information Extraction and Question Answering.

Figure 2:
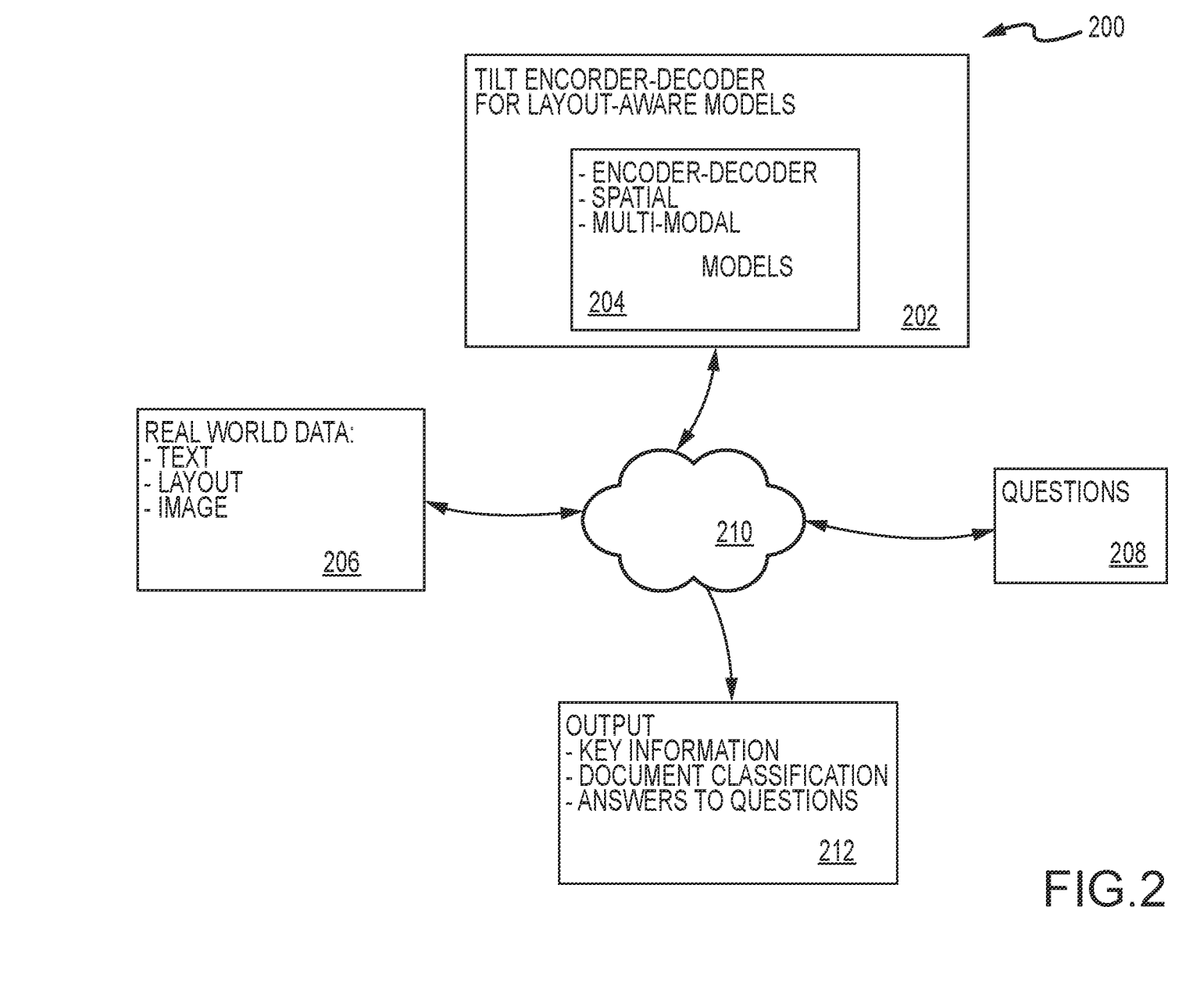
FIG. 2 is a system diagram of an embodiment of a real-world document processing system as described herein.

FIG. 2 is a system diagram of an embodiment of a real-world document processing system 200 as described herein. NLP system 202 in an embodiment is a text-image-layout transformer (TILT). TILT 202 employs models 204, which include an encoder-decoder model, a spatial model, and a multi-modal model. TILT 202 is embodied as a software instructions executed by one or more processors that could reside anywhere.

TILT 206 receives real world data 206 including text data, layout data, and image data electronically via any type of data network 210. TILT 202 also receives questions 208 via data network 210.

TILT generates output 212 which includes key information, document classification and answers to questions 208. As with any electronic data, any of the elements shown in system 200 could physically reside anywhere, and be generated and processed by any type of processor as understood in the art.

Overview of Approaches According to Various Embodiments

Spatial-Aware Transformers

When tasks involving 2D documents are considered, sequential models can be outperformed by considering layout information either directly as positional embeddings or indirectly by allowing them to be contextualized on their spatial neighborhood. Further improvements focus on the training and inference aspects by the inclusion of the area masking loss function or achieving independence from sequential order in decoding respectively. In contrast to these previous methods, bias is added to self-attention instead of positional embeddings, and it is generalized to distances on the 2D plane. Additionally, a word-centric masking method concerning both images and text is employed. Moreover, by choosing to use an encoder-decoder, independence from sequential order in decoding is granted without dedicated architectural changes.

Encoder-Decoder for IE and QA

Most NLP tasks can be unified under one framework by casting them as Language Modeling, Sequence Labeling or Question Answering. The QA program of unifying NLP frames all the problems as triplets of question, context and answer or item, property name, and answer. Although this does not necessarily lead to the use of encoder-decoder models, several previous solutions have relied on variants of Transformer architecture. The T5 Transformer is a prominent prior art example of largescale Transformers achieving state-of-the-art results on varied NLP benchmarks. In embodiments, this approach is extended beyond the text-to-text scenario by making it possible to consume a multi-modal input.

Multi-Modal Transformers

Multi-modal transformers attack the relationships between text and other media. In the context of images, this niche was previously approached with an image-to-text cross-attention mechanism or, alternatively, by adding visual features to word embeddings or concatenating them. In contrast to previous approaches, according to embodiment, visual features are added to word embeddings already contextualized on an image's multiple resolution levels.

Model Architecture

In an embodiment, the architecture of a Transformer, initially proposed for the problem of Neural Machine Translation, is a solid base for all generative tasks involving natural language.

Starting from the general view on attention in the first layer of the Transformer. If n denotes the number of input tokens, resulting in a matrix of embeddings X, then self-attention can be seen as:

$$softmax\left(\frac{Q_X K_X^T}{\sqrt{n}} + B\right) V_X \qquad (1)$$

where $Q_X$, $K_X$ and $V_X$ are projections of X onto query, keys and value spaces, whereas B stands for an optional attention bias. There is no B term in the original Transformer, and information about the order of tokens is provided explicitly to the model, i.e.:

$$X = S + P \quad B = 0_{n \rightarrow d}$$

where S and P are respectively the semantic embeddings of tokens and positional embedding resulting from their positions. $0_n 0_{n \rightarrow} d$ denote a zero matrix.

Figure 3:
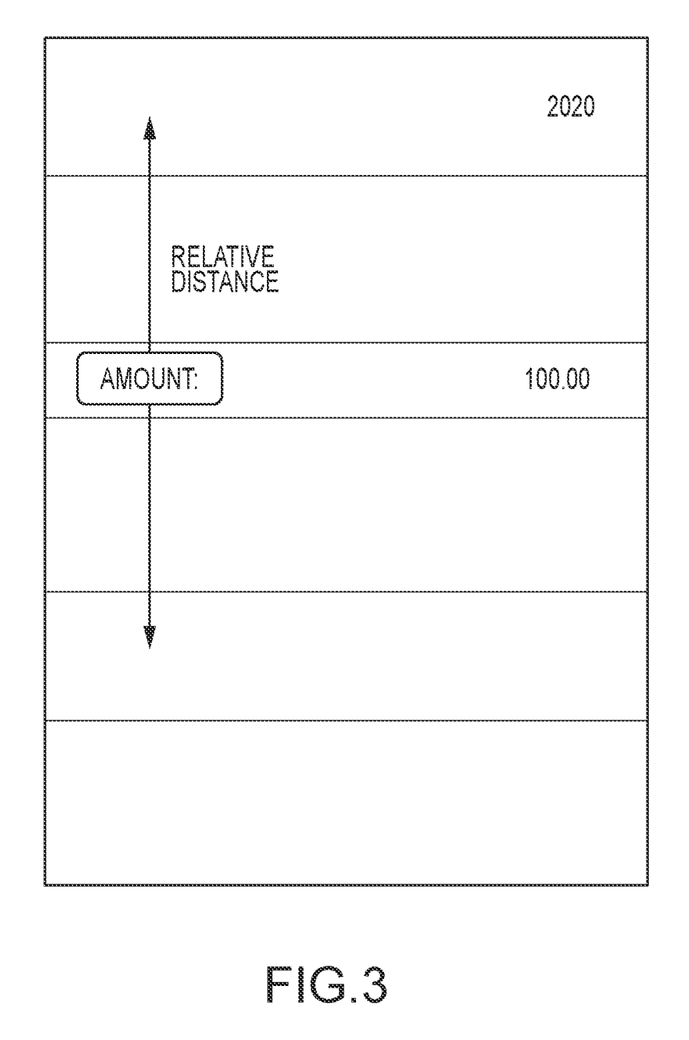
FIG. 3 is a diagram illustrating spatial relationships between tokens in a document according to an embodiment.

In contrast to the original formulation, we rely on relative attention biases instead of positional embeddings. These are further extended to take into account spatial relationships between tokens, as shown in the document excerpt of FIG. 3, with distinguished vertical buckets for the Amount token.

Model Architecture: Spatial Bias

In an embodiment, the conventional T5 architecture approach is extended to spatial dimensions. Conventional T5 architecture disregards positional embeddings by setting X=S, thus introducing relative bias by extending self-attention's equation with the sequential bias term $B = B^{1D}$, a simplified form of positional signal inclusion. Here, each logit used for computing the attention head weights has some learned scalar added, resulting from corresponding token-to-token offsets. In an embodiment extending this basic approach to spatial dimensions, biases for relative horizontal and vertical distances between each pair of tokens are calculated and added to the original sequential bias:

$$B = B1D + BH + BV$$

Such bias falls into one of 32 buckets, which each group being similarly-distanced tokenpairs. The size of the buckets grows logarithmically, so that greater token pair distances are grouped into larger buckets.

Model Architecture: Contextualized Image Embeddings

Figure 5:
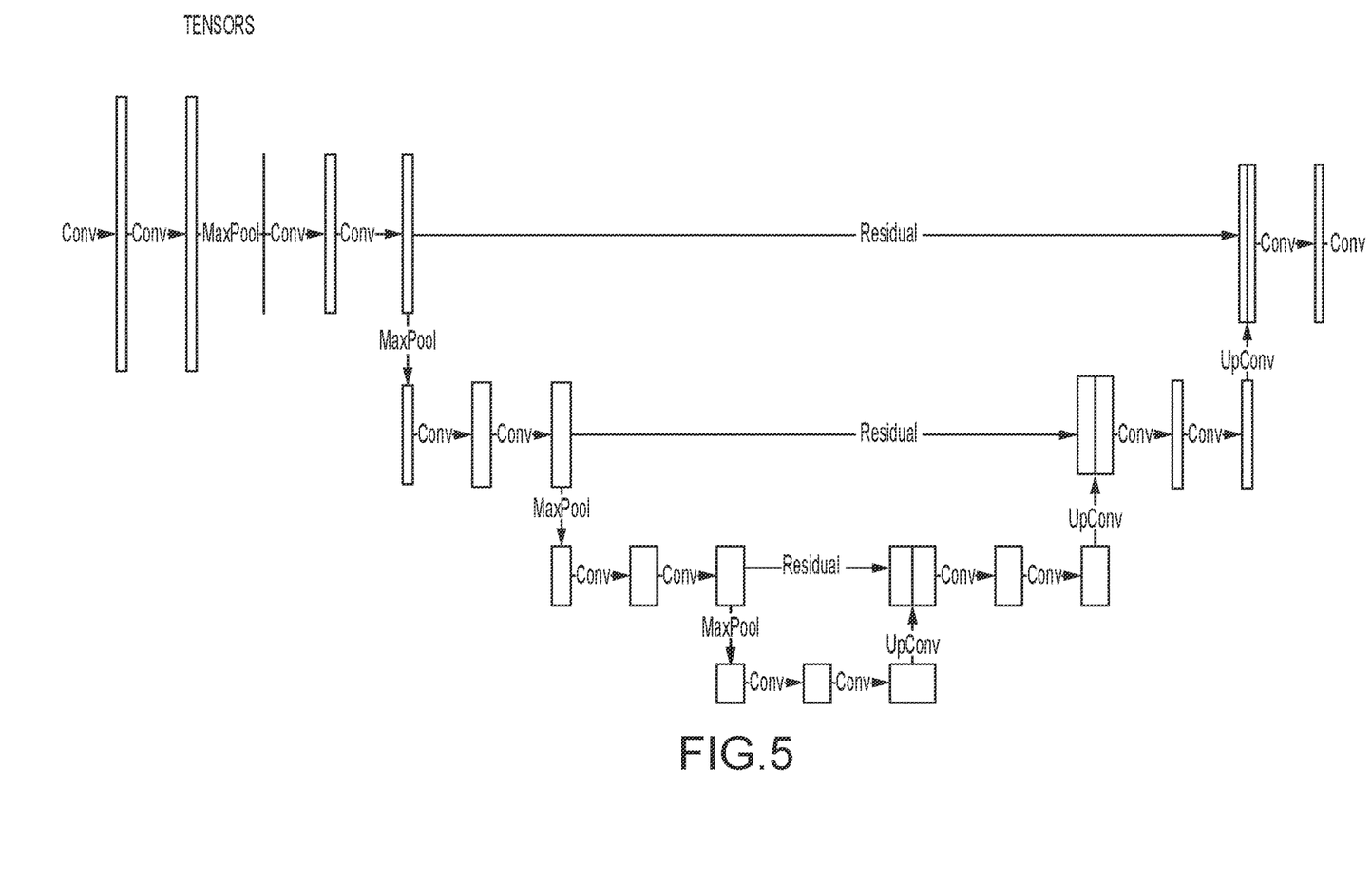
FIG. 5 is an illustration of a U-NET network according to an embodiment.

In conventional systems, contextualized Word embeddings are expected to capture context-dependent semantics. In light of this fact, for the entire input sequence, an associated sequence of vectors is returned. In an embodiment, contextualized Image embeddings have the same objective, that is, they cover the image region semantics in the context of its entire visual neighborhood. In an embodiment, to produce image embeddings, a convolutional network that consumes the whole page image of size 512×384 is used, and it produces a feature map of 64×48×128. An embodiment uses U-Net as a backbone encoder network since this architecture provides access to not only the information in the near neighborhood of the token, such as font and style, but also to more distant regions of the page, which is useful in cases where the text is related to other structures, e.g., where the text is the description of a picture.

FIG. 5 illustrates a truncated U-Net network $\bar{\text{A}}$ conv $\bar{\text{A}}$ max-pool $\bar{\text{A}}$ up-conv $\bar{\text{A}}$ residual, this multi-scale property emerges from the skip connections within chosen architecture. Then, bounding boxes of each token are used to extract features from U-Net's feature map with ROI pooling.

An image, represented as a matrix of pixels, is processed by a number of convolutional layers Conv combined with max-pooling operations MaxPool to obtain a dense tensor representation of the image. Then, this representation is processed by a combination of up-convolutions UpConv and convolutions Conv with residual connections Residual from corresponding steps. This way representations in higher resolutions are obtained, including the final output of the network representing visual features of the image.

Figure 4A:
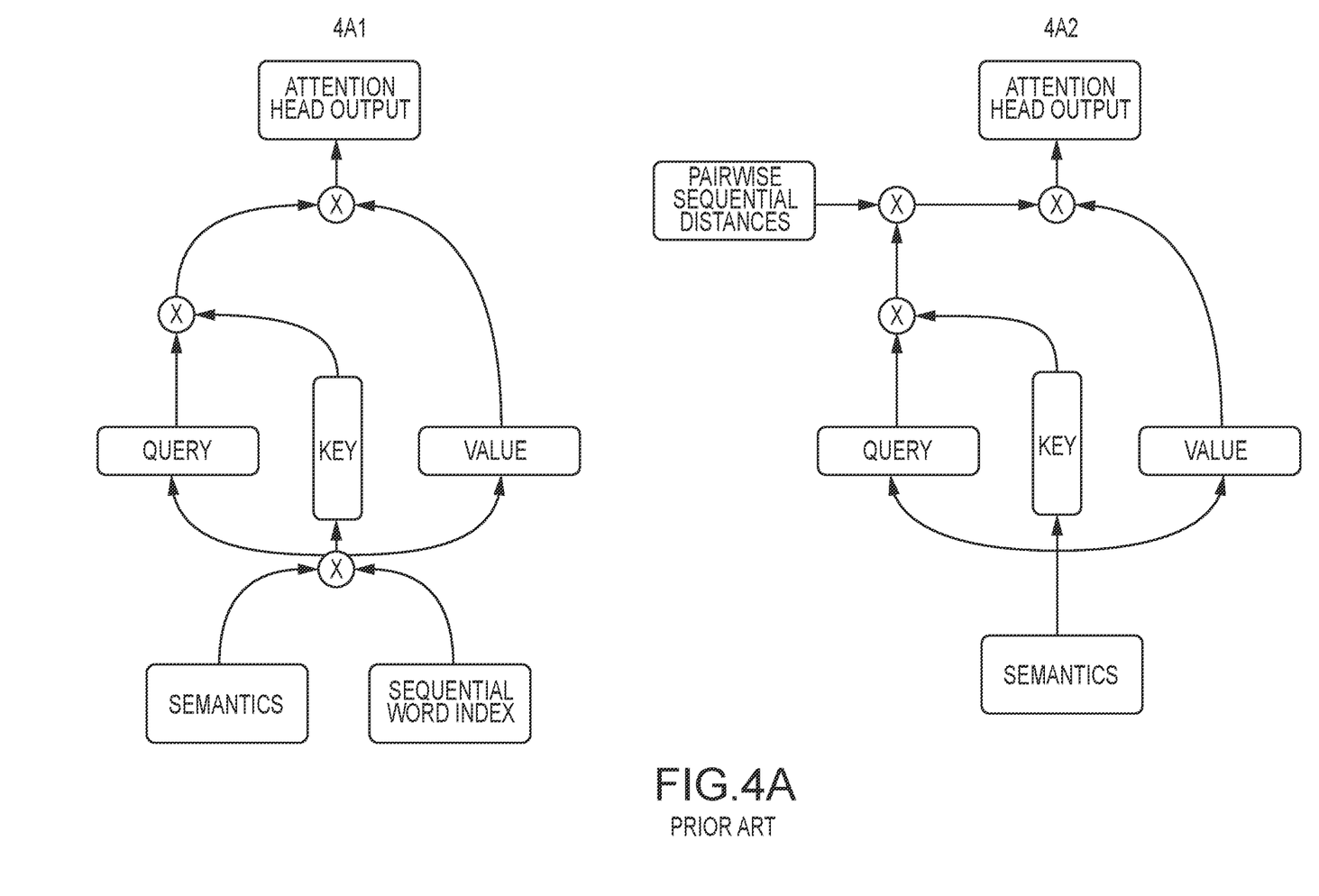
FIG. 4A is an illustration of prior art Transformer schemes.

With reference to FIG. 4A. In the original "Vanilla" Transformer 4A1, information about the order of tokens is provided explicitly to the model by positional embeddings added to semantic embeddings. In the T5 architecture, 4A2, sequential bias is introduced, thus separating semantics from sequential distances.

Figure 4B:
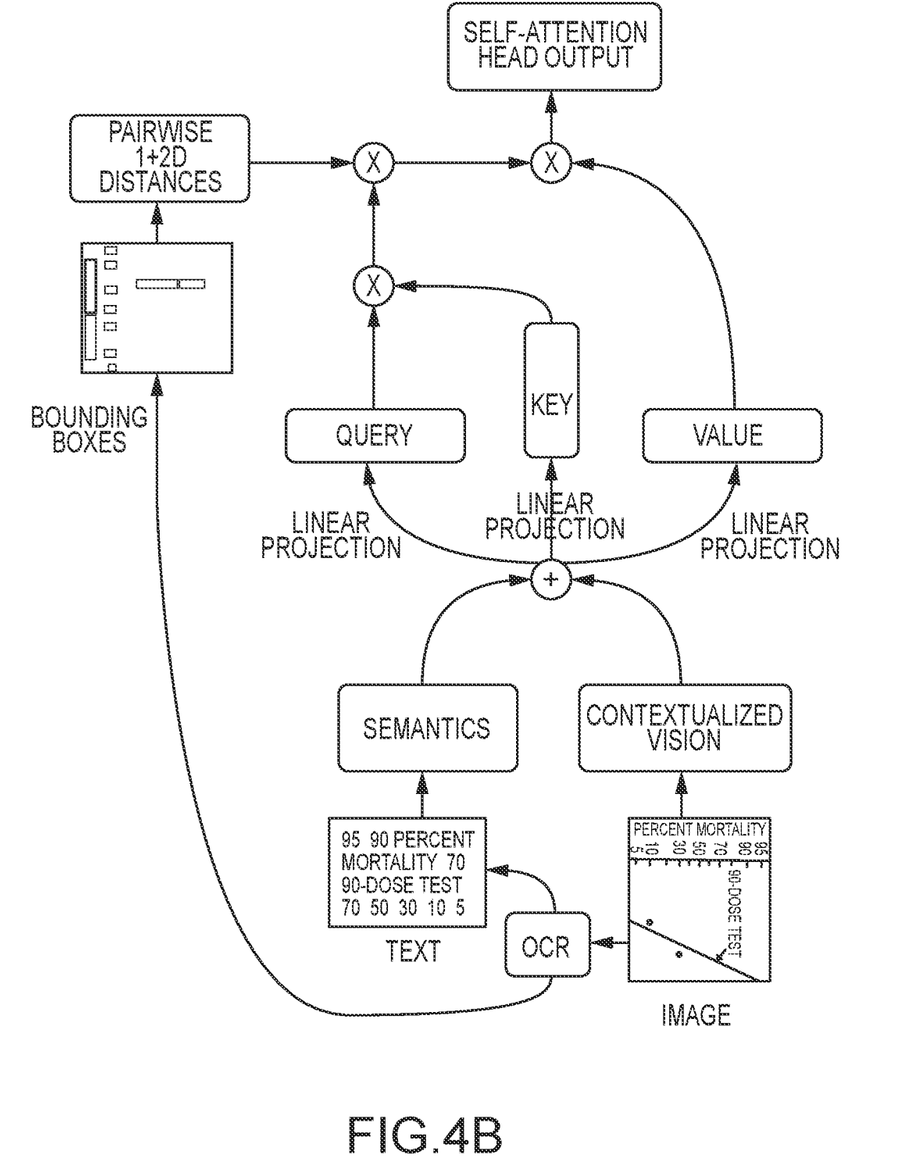
FIG. 4B is an illustration of a Transformer scheme according to embodiments described herein.

FIG. 4B illustrates an embodiment in which this clear distinction is maintained, but in addition, biases are extended with spatial relationships, and additional image semantics are provided at the input.

An image, represented as a matrix of pixels, is processed by an OCR system to obtain text tokens. The distributional and contextualized semantics of text tokens is embedded into a multidimensional vector space. Text embeddings are added, using the vector-sum operation, to the contextualized visual features obtained directly from the image, each text token is assigned distinct visual features relative to its position and surroundings. The joint embeddings are mapped into queries, keys and values, using learnable linear projections. Queries are matched against keys using dot product. The result of this operation is summed with corresponding attention biases combining linear 1D relations as well as spatial 2D relations; the spatial 2D relations are, in turn, determined using the distances of bounding boxes of each token, as obtained with OCR. The attention biases are determined in a pair-wise manner, for each pair of text tokens. Query-key match summed with attention bias is then used to select the appropriate values. The weighted sum of values is returned as the output of a self-attention head and constitutes a contextualized embedding to be used as the input to the next layer.

The weights and embeddings are learnt in an automatic manner using back-propagation.

Embeddings

In order to inject visual information to the Transformer, a matrix of contextualized image-region embeddings I is added to semantic embedding we define:

$$X = S + I$$

in line with the convention from the Model Architecture section above.

Regularization Techniques

In the sequence labeling scenario, each document leads to multiple training instances (token classification), whereas in Transformer sequence-to-sequence models, the same document leads to one training instance with higher feature space (decoding from multiple tokens).

Since most of the tokens are irrelevant in Key Information Extraction and contextualized word embeddings are correlated by design, embodiments overfit more easily than their sequence labeling counterparts. To improve the model's robustness, we introduce a regularization technique for each modality.

Regularization Techniques: Case Augmentation

Subword tokenization, commonly used with Transformer architecture, has several identified disadvantages. For example, it is deterministic while it has been shown that non-deterministic segmentation leads to more robust models due to learning the compositionality of words better. Moreover, pretrained models tend to underperform when text is written with all capitals, since it leads to different segmentation with embeddings of rarely used units. Both of these problems are overcome in an embodiment with a straightforward regularization strategy. Augmented copies of data instances are produced by lower-casing or upper-casing both document and target text simultaneously.

Regularization Techniques: Spatial Bias Augmentation

According to an embodiment, spatial biases are augmented by multiplying the horizontal and vertical distances between tokens by a random factor. Such transformation resembles stretching or squeezing document pages in horizontal and vertical dimensions. Factors used for scaling each dimension are sampled uniformly.

Regularization Techniques: Affine Vision Augmentation

To correct for visual deformations of real-world documents, images are augmented with an affine transformation, preserving parallel lines within an image but modifying its position, angle, size, and shear. When such modifications are performed on the image, the bounding boxes of every text token are updated accordingly. In an embodiment, the exact hyperparameters were subject to an optimization performed on a base model for a DocVQA dataset.

Iterative Training of Artificial Neural Networks without Annotated Data

One embodiment of the invention enables information retrieval from documents without training data. Certain implementations facilitate the training of artificial neural networks for data point extraction when the user has set of documents with no annotated data.

One goal of the training is to generate a prediction model for extracting a of set of data points from documents. As used herein, a data point is a single piece of information which constitutes a business value for the user in the context of the business process where documents serve as input. All data points extracted should provide a complete set of information necessary to execute actions in accordance with the purpose of a given business process. Data point can be: type of the document, intent of document creation, personal information, person name, organization name, address, date, amount, identifier and any other named entity or concept used in business processes. Examples of business processes are: resolution of customer complaint, verification of loan application, underwriting of insurance claim. Examples of data points are: for customer complaint: customer name, date of the complaint, reason of the complaint; for loan application: bank account number, requested loan amount, requested repayment period; for insurance claim: policy number, date of the accident. A data point is to be extracted from the document. Data points can be explicitly present in the document or can be implicitly deduced from the document content. "Extracted value" is the instance of the information, present in the document, which corresponds the data point in question. Each data point has a unique label defined by the user. "Label" serves as a unique identifier of the data point. Prediction returns pairs: a label, an extracted value, and an approximate part of the document where the data points were extracted from.

The training process is iterative. The result of each iteration is a working prediction model able to process a document and return a value for each data point. The model is evaluated at the end of each iteration. The user verifies the correctness of the predictions provided by the model comparing the extracted values with the information present in the document. The model quality is measured as a percentage of correct predictions. The quality of the model improves over time. The process is stopped when the user achieves satisfactory quality.

Figure 6:
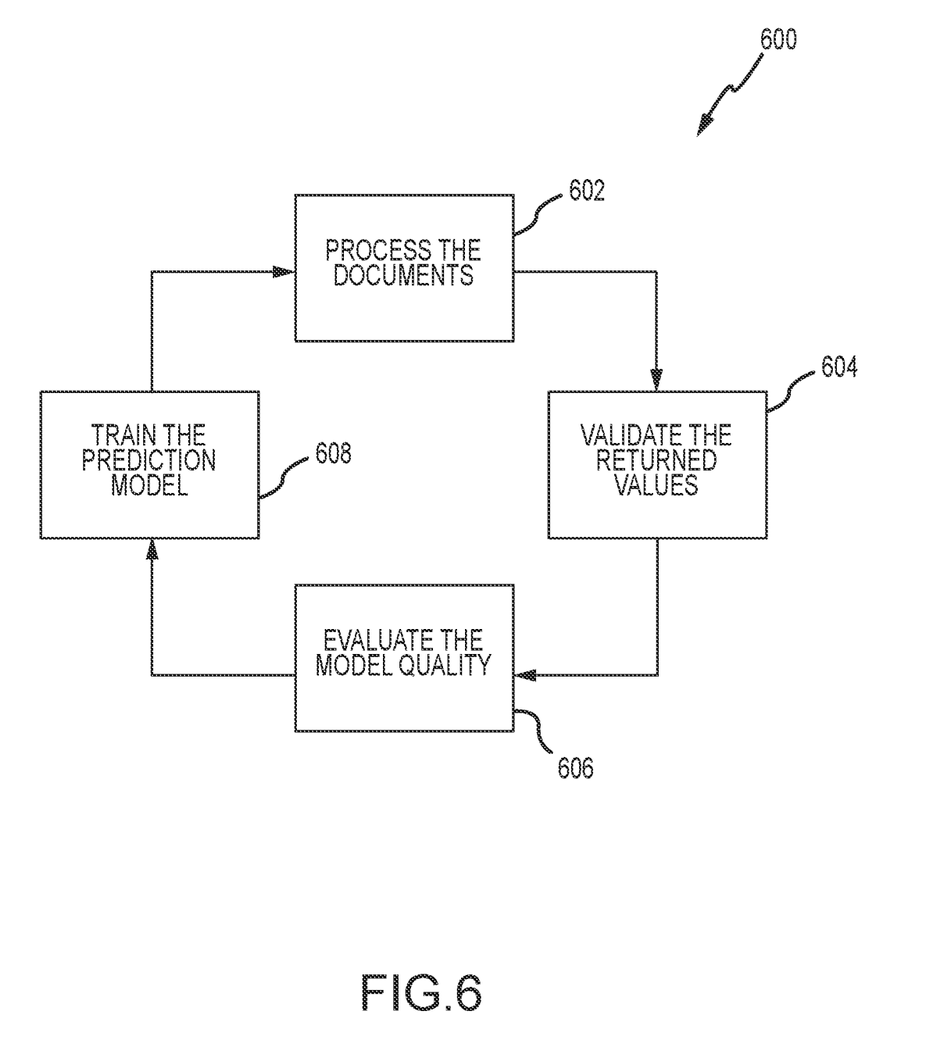
FIG. 6 is an overview of an embodiment of a training process according to an embodiment.

Referring to FIG. 6, an overview of an embodiment of a training process 600 is illustrated. Each iteration consists of the following steps performed by the user. Sample documents are documents of a type that includes the kind of document form and included information expected to be processed. At 602, the documents are processed with the model. In a first iteration a generic neural network is used. The generic neural network returns predictions, answering the questions asked in natural language. In next iterations a fine-tuned neural network is used. At 604, the extracted values returned by the prediction model are validated for the sample documents. Validated data for each data point consists of validated extracted value where correct answers are confirmed, incorrect or missing answers are completed. At 606, the quality of the model is evaluated with the use of validated data. At 608, the prediction model is trained using validated data for few sample documents.

Figure 7:
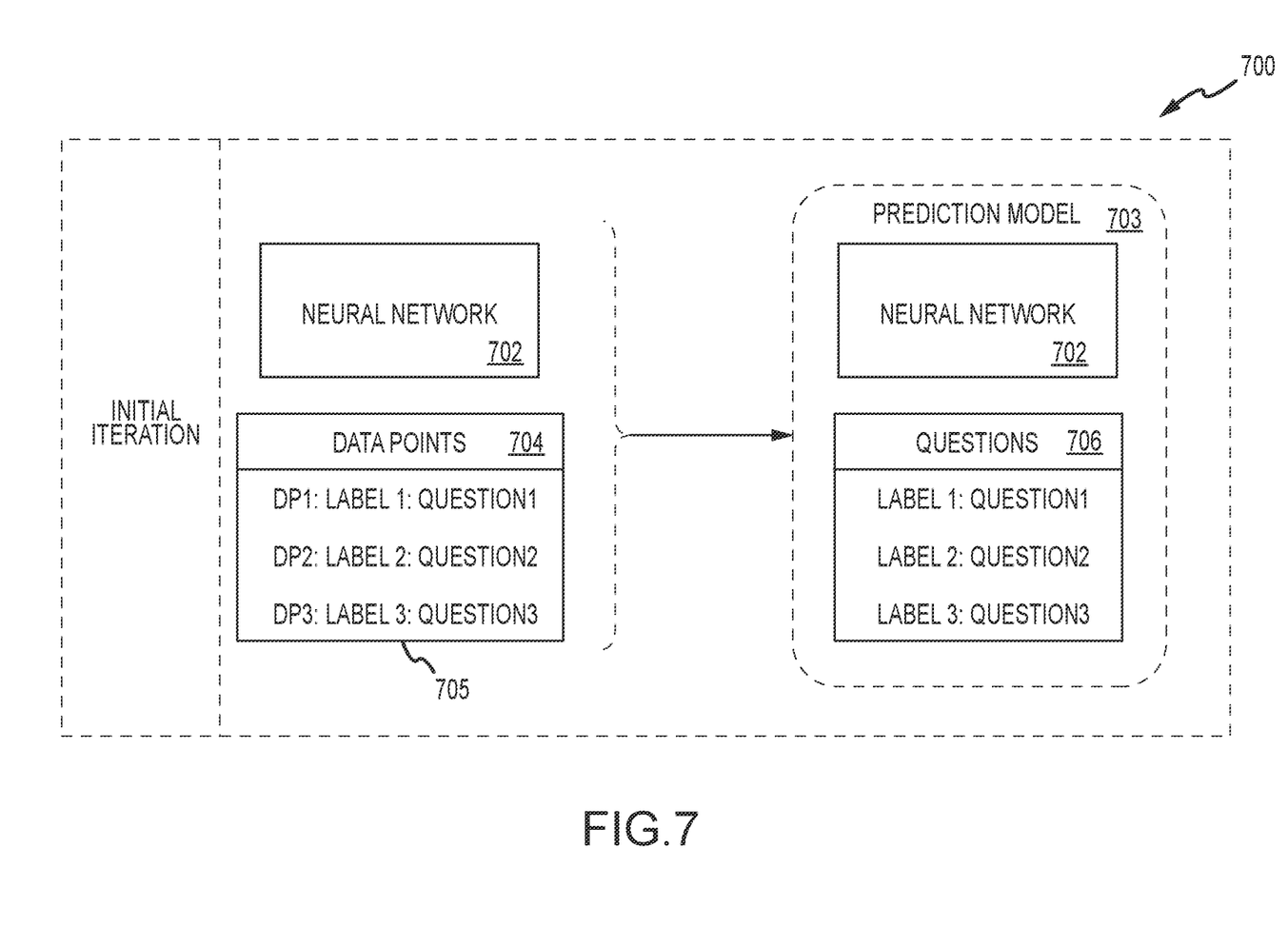
FIG. 7 is an illustration of an initial iteration of the training process according to an embodiment.

The training process is initiated without training data. With reference to FIG. 7, an initial iteration of the training process 700 starts with definition of data points 704 and formulation of a set of questions in natural language. Each data point 704 has assigned a label, which serves as unique identifier for a data point. Each data point corresponds to single or multiple questions 705. A neural network 702 is able to interpret a question and predict the answer based on the content, layout and graphical elements present in the document. The initial prediction model 703 consists of the neural network 702 and a set of questions 706.

Validation 604 includes the verification of the predicted values returned by the prediction model against the document content. If the returned value is correct, the user confirms the predicted value. If the returned value is not consistent with the document content, the user corrects the value in line with document content. If the information is not present and cannot be deducted from the document content, the user explicitly marks the extracted value as empty. Validation may also lead to the revision of questions for selected data points, if questions are not specific enough or leads to ambiguous answers. In this case questions can be modified or replaced with ones more precisely defining the piece of information corresponding to required data point.

Training

Figure 8:
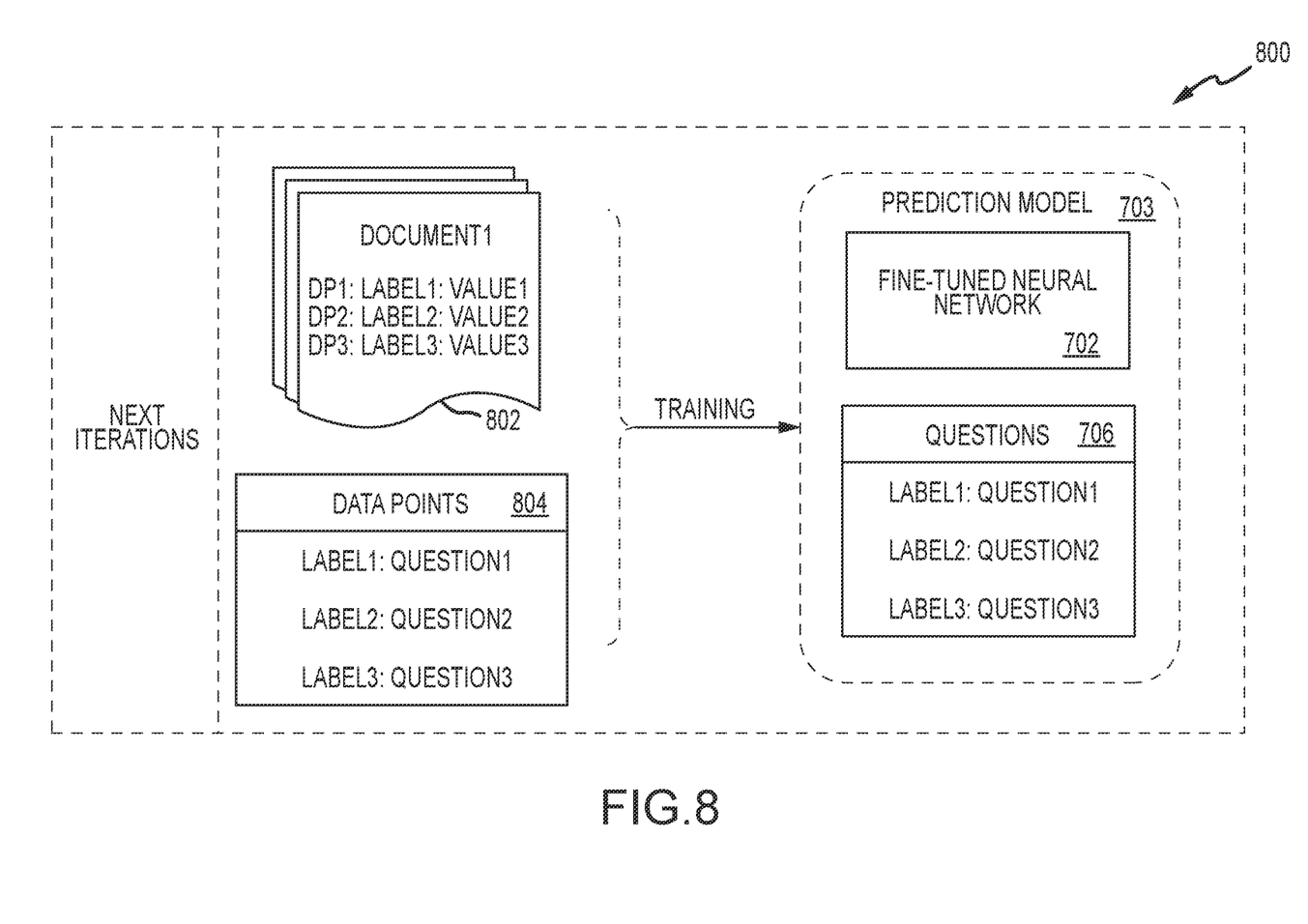
FIG. 8 is an illustration of a process of fine-tuning of the neural network with use of questions in natural language according to an embodiment.

With reference to FIG. 8, the training of the prediction model 703 is a process of fine-tuning of the neural network with use of questions in natural language. Training data is in the form of document content, and pairs (label, value pairs), validated in the preceding iteration. The neural network receives the following: content of the documents with all artifacts such as semantics, graphics, pictures, charts, tables, checkboxes, signatures, stamps, handwriting, layout, and formatting.

With reference to FIG. 6 again, the evaluation process assumes short iterations when only a few documents per iteration are validated. Despite the limited number of documents in the validation set, the results of evaluation are comparable iteration to iteration and reliable—they correctly approximate expected model quality with acceptable variance, comparing with evaluation performed on a statistically, sufficiently numerous collection of documents.

Figure 9:
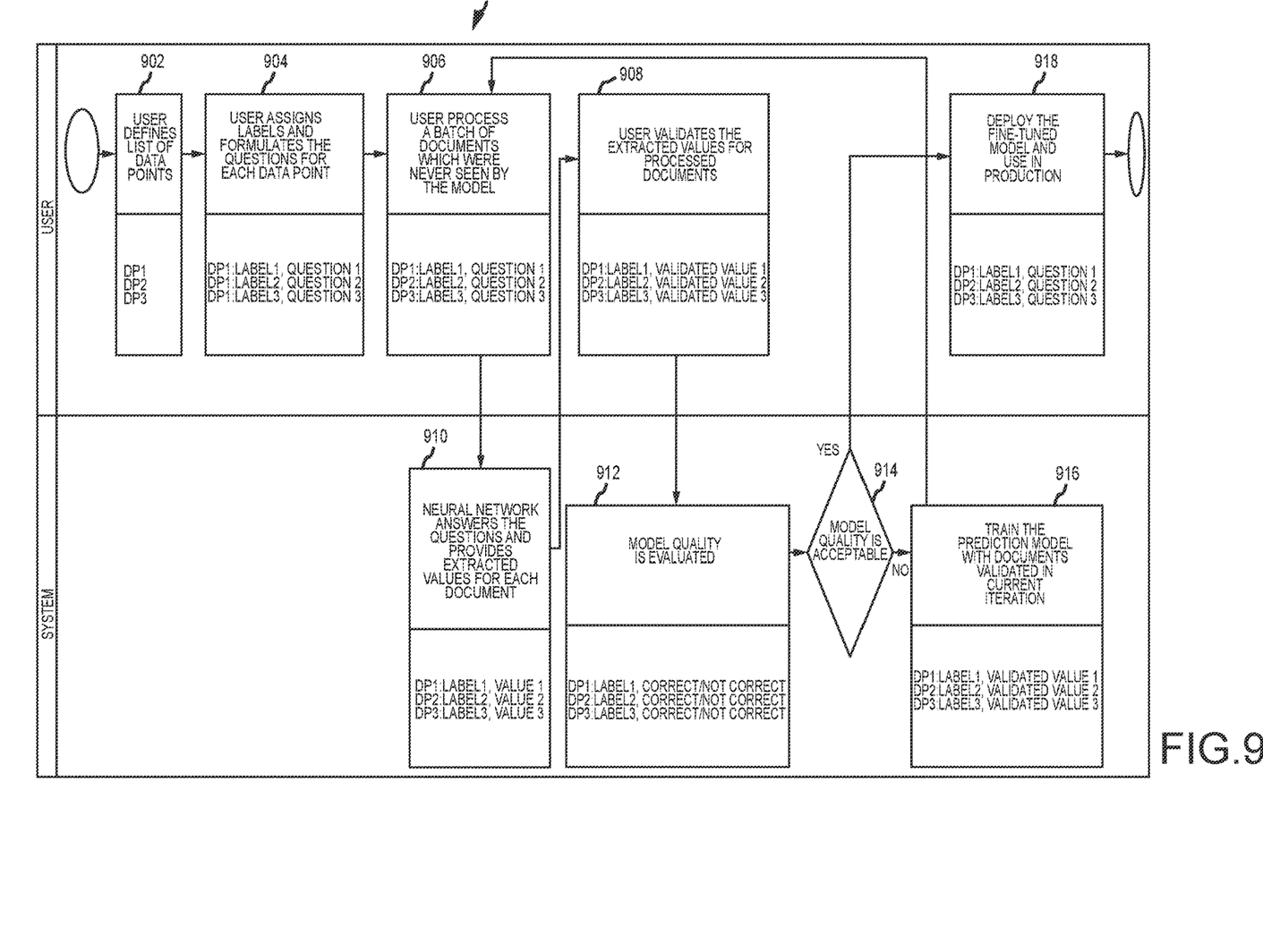
FIG. 9 is flow diagram that serves as an overview of an iterative training process according to an embodiment.

FIG. 9 is a flow diagram that serves as an overview of an iterative training process 900 according to an embodiment. AS can be seen in the Figure, the actions taken by the user and by the system are delineated.

At 902, a user defines a list of data points. In this illustration there are three data points, DP1, DP2, and DP3. At 904, the user assigns labels, and formulates questions for each of the data points. At 906, the user processes a batch of documents. These documents have not been previously exposed to the system as previously described herein. At 910, the neural network answers the formulated questions and generates extracted values for each question and for each document.

At 908, the user validates extracted values for the processed documents. The values include validated values for each of the labels.

At 912, model quality is evaluated by the system, which includes generating a "correct" or "not correct" response for each data point. At 914, it is determined by the system whether the model quality is acceptable or not.

If the model quality is not acceptable, at 916, the prediction model is trained (again) with document validated in the current iteration, generating a new set of data to replace the one as shown in 908.

If the model quality is acceptable, at 918 the model is defined in the system as a "fine-tuned model" and is used in production. "Use in production" means that for the types of documents used in the process of FIG. 9, no more user action is required.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for Natural Language Processing (NLP) of real world documents, the system comprising:
   one or more processors on which an NLP process is executed, the process comprising executable instructions that when executed by the one or more processors, perform a method, the method comprising,
     receiving data comprising at least text data, layout data, and image data; and
     operating on the received data to generate a useful output that relates to analysis of the received data; and
   an iterative training process that receives documents and generates outputs, wherein the iterative training process comprises enabling information retrieval from documents without training data.

2. The system of claim 1, wherein the method further comprises executing one or more models selected from a group comprising:
   an encoder-decoder model;
   a spatial model, and;
   a multi-modal model.

3. The system of claim 1, wherein the method further comprises receiving one or more questions regarding the received data.

4. The system of claim 3, wherein the useful output comprises answers to the one or more questions.

5. The system of claim 3, wherein the useful output comprises key information.

6. The system of claim 3, wherein the useful output comprises document classification.

7. The system of claim 2, wherein the spatial model comprises a spatial-aware transformer that employs self-attention and a word-centric masking method that concerns both images and text.

8. The system of claim 2, wherein the multi-modal model comprises adding visual features to word embeddings that are contextualized on multiple resolution levels of an image.

9. The system of claim 8, wherein the multi-modal model further comprises reliance on relative attention biases.

10. The system of claim 1, wherein the method further comprises extending a T5 architectural approach to spatial dimensions.

11. The system of claim 1, wherein the method further comprises generating contextualized image embeddings.

12. The system of claim 1, wherein the method further comprises spatial bias augmentation.

13. A method for Natural Language Processing (NLP) of real world documents, the system comprising:
   one or more processors on which an NLP process is executed, the process comprising executable instructions that when executed by the one or more processors, perform a method, the method comprising,
     receiving data comprising at least text data, layout data, and image data; and
     operating on the received data to generate a useful output that relates to analysis of the received data; and
   an iterative training process that receives documents and generates outputs, wherein the iterative training process comprises enabling information retrieval from documents without training data.

14. The method of claim 13, wherein the method further comprises executing one or more models selected from a group comprising:
   an encoder-decoder model;
   a spatial model, and;
   a multi-modal model.

15. The method of claim 13, wherein the method further comprises receiving one or more questions regarding the received data.

16. The method of claim 15, wherein the useful output comprises answers to the one or more questions.

17. The method of claim 15, wherein the useful output comprises key information.

18. The method of claim 15, wherein the useful output comprises document classification.

19. The method of claim 14, wherein the spatial model comprises a spatial-aware transformer that employs self-attention and a word-centric masking method that concerns both images and text.

20. The method of claim 14 wherein the multi-modal model comprises adding visual features to word embeddings that are contextualized on multiple resolution levels of an image.

21. The method of claim 20, wherein the multi-modal model further comprises reliance on relative attention biases.

22. The method of claim 13, wherein the method further comprises extending a T5 architectural approach to spatial dimensions.

23. The method of claim 13, wherein the method further comprises generating contextualized image embeddings.

24. The method of claim 13, wherein the method further comprises spatial bias augmentation.

25. A non-transient computer medium having stored thereon instructions, which when executed by a processor perform a method, the method comprising:
   receiving data comprising at least text data, layout data, and image data; and
   operating on the received data to generate a useful output that relates to analysis of the received data; and
   an iterative training process that receives documents and generates outputs, wherein the iterative training process comprises enabling information retrieval from documents without training data.

26. The non-transient computer medium of claim 25, wherein the method further comprises executing one or more models selected from a group comprising:
   an encoder-decoder model;
   a spatial model, and;
   a multi-modal model.

27. The non-transient computer medium of claim 25, wherein the method further comprises receiving one or more questions regarding the received data.

28. The non-transient computer medium of claim 27, wherein the useful output comprises answers to the one or more questions.

* * * * *